(12) United States Patent
Day

(10) Patent No.: US 7,522,910 B2
(45) Date of Patent: Apr. 21, 2009

(54) METHOD AND APPARATUS FOR CONTROLLING DATA PROVIDED TO A MOBILE DEVICE

(75) Inventor: Jia-Der Day, Redwood Shores, CA (US)

(73) Assignee: Oracle International Corporation, Redwood Shores, CA (US)

(*) Notice: Subject to any disclaimer, the term of this patent is extended or adjusted under 35 U.S.C. 154(b) by 380 days.

(21) Appl. No.: 10/159,223

(22) Filed: May 31, 2002

(65) Prior Publication Data

US 2003/0224760 A1    Dec. 4, 2003

(51) Int. Cl.
| H04L 12/58 | (2006.01) |
| H04L 29/08 | (2006.01) |
| H04M 11/10 | (2006.01) |
| H04M 1/64 | (2006.01) |
| H04M 1/00 | (2006.01) |
| H04B 1/38 | (2006.01) |

(52) U.S. Cl. .......... 455/412.1; 455/413; 455/414.4; 455/566; 455/556.2; 379/88.12; 379/88.13; 379/88.17; 379/88.25; 709/206; 709/207; 709/219

(58) Field of Classification Search .......... 455/412.1, 455/419, 412.2, 414.4, 413, 566, 556.2; 709/206, 219, 207; 707/202; 379/88.12, 379/88.13, 88.17, 88.25
See application file for complete search history.

(56) References Cited

U.S. PATENT DOCUMENTS

| 5,493,692 A | * | 2/1996 | Theimer et al. ............ 455/26.1 |
| 5,958,006 A | * | 9/1999 | Eggleston et al. ........... 709/219 |
| 6,167,261 A | * | 12/2000 | Amin ....................... 455/426.1 |
| 6,216,165 B1 | * | 4/2001 | Woltz et al. ................. 709/232 |
| 6,363,140 B1 | | 3/2002 | Pinard |
| 6,442,589 B1 | * | 8/2002 | Takahashi et al. ........... 709/203 |
| 6,480,711 B1 | * | 11/2002 | Guedalia .................. 455/412.1 |
| 6,496,693 B1 | * | 12/2002 | Tran ........................ 455/426.1 |
| 6,650,890 B1 | * | 11/2003 | Irlam et al. ............... 455/412.1 |
| 6,701,378 B1 | * | 3/2004 | Gilhuly et al. .............. 709/249 |
| 6,741,855 B1 | * | 5/2004 | Martin et al. ............... 455/419 |
| 6,781,972 B1 | * | 8/2004 | Anderlind et al. .......... 370/329 |

(Continued)

FOREIGN PATENT DOCUMENTS

EP    0 932 320 A2    7/1999

(Continued)

OTHER PUBLICATIONS

Crispin, M., "Internet Message Access Protocol-Version 4rev1," Network Working Group, Request for Comments: 2060, Dec. 1996, XP-002122132, pp. 1-71.

(Continued)

Primary Examiner—Fan Tsang
Assistant Examiner—Lisa Hashem
(74) Attorney, Agent, or Firm—Hickman Palermo Truong & Becker LLP

(57) ABSTRACT

Techniques are provided for communicating data to a mobile device. A system receives a request for data from a mobile device. The system identifies filter criteria associated with the mobile device. The filter criteria is applied to a set of data to identify particular data elements that satisfy the filter criteria. The identified data elements are then transmitted to the mobile device.

24 Claims, 6 Drawing Sheets

U.S. PATENT DOCUMENTS

| | | | |
|---|---|---|---|
| 6,983,310 B2 * | 1/2006 | Rouse et al. | 709/206 |
| 7,076,241 B1 * | 7/2006 | Zondervan | 455/412.1 |
| 7,103,313 B2 * | 9/2006 | Heinonen et al. | 455/41.2 |
| 7,200,556 B2 * | 4/2007 | Aktas et al. | 704/235 |
| 7,249,182 B1 * | 7/2007 | Heinonen et al. | 709/227 |
| 7,318,073 B2 * | 1/2008 | Shields et al. | 707/202 |
| 2001/0047397 A1 * | 11/2001 | Jameson | 709/217 |
| 2002/0004855 A1 | 1/2002 | Cox et al. | |
| 2002/0086661 A1 * | 7/2002 | Rouse et al. | 455/412 |
| 2003/0028604 A1 * | 2/2003 | Aktas et al. | 709/206 |
| 2003/0046421 A1 * | 3/2003 | Horvitz et al. | 709/238 |
| 2003/0096600 A1 * | 5/2003 | Lewis et al. | 455/412 |
| 2003/0126216 A1 * | 7/2003 | Avila et al. | 709/206 |
| 2003/0194990 A1 * | 10/2003 | Helferich | 455/412.2 |
| 2003/0204568 A1 * | 10/2003 | Bhargava et al. | 709/206 |
| 2003/0212745 A1 * | 11/2003 | Caughey | 709/206 |
| 2004/0078447 A1 * | 4/2004 | Malik et al. | 709/206 |
| 2006/0015563 A1 * | 1/2006 | Judge et al. | 709/206 |
| 2007/0021108 A1 * | 1/2007 | Bocking et al. | 455/414.1 |
| 2007/0142034 A1 * | 6/2007 | Clarke et al. | 455/412.2 |
| 2007/0274473 A1 * | 11/2007 | Skladman et al. | 379/88.13 |
| 2008/0147818 A1 * | 6/2008 | Sabo | 709/206 |

FOREIGN PATENT DOCUMENTS

| | | |
|---|---|---|
| EP | 0932320 A2 | 7/1999 |
| EP | 1 063 821 A2 | 12/2000 |
| EP | 1063821 A2 * | 12/2000 |
| JP | 11-203216 | 7/1999 |
| JP | 2000-115527 | 4/2000 |
| JP | 2002-010328 | 1/2002 |

OTHER PUBLICATIONS

European Patent Office, "Communication pursuant to Article 96(2) EPC," App. No. 03 731 319.4, dated Sep. 9, 2005, 7 pages.

Current Claims, App. No. 03 731 319.4, 6 pages.

Claims, foreign patent application No. 2003241572, 5 pages.

Australian Government, "Examiner's first report on patent application No. 2003241572", dated Jul. 31, 2007, 2 pages.

"Notice of Grounds of Rejection" received in corresponding Japanese Application No. 510175/2004 dated Apr. 22, 2008, 15 pages.

Office Action received in corresponding Australian Application No. 2003241572 dated Jun. 27, 2008, 1 page.

"Notice of Grounds of Rejection" received in corresponding Japanese Application No.: 510175/2004, dated Feb. 3, 2009, 3 pages.

* cited by examiner

| ATT | FROM | SUBJECT | DATE |
|---|---|---|---|
| ✓ * | BOB JONES | ACME REPORT DUE | FRI 5/3/02 |
| ✓ DOC | RWILLIAMS@NEW... | MEETING REQUEST | FRI 5/3/02 |
| | NEW_ACCOUNTS | INFORMATION REGARDING NEW ACCOUNT | FRI 5/3/02 |
| | JANE DOE | SOFTWARE UPGRADE AVAILABLE | FRI 5/3/02 |
| ✓ * | MIKESMITH@NET1.COM | SOFTBALL GAME? | THU 5/2/02 |
| | LARRY BAKER | LUNCH MEETING | THU 5/2/02 |
| ✓ DOC | BOB JONES | UPCOMING DEADLINES | THU 5/2/02 |
| ✓ DOC | REGISTRATION@ACM... | REGISTRATION CONFIRMATION | THU 5/2/02 |
| | JENNIFER | NEW CAR LOAN | THU 5/2/02 |
| | JOHN JACOBS | NEWSPAPER ARTICLE | THU 5/2/02 |
| ✓ * | ROGER DOE | MEETING WITH ACCOUNTING DEPT | THU 5/2/02 |

FIG. 2

| | FROM | SUBJECT |
|---|---|---|
| * | BOB JONES | ACME REPO... |
| * | LARRY BA... | LUNCH MEE... |
| | BOB JONES | UPCOMING ... |
| | JENNIFER | NEW CAR ... |
| * | ROGER DOE | MEETING W... |

FIG. 3

| USER PROFILE 2 — 700 | |
|---|---|
| ATTRIBUTE | ATTRIBUTE VALUE |
| MESSAGE URGENCY | URGENT MESSAGES |
| MESSAGE FROM | BOB JONES, JENNIFER |

FIG. 7

| USER PROFILE 1 — 600 | |
|---|---|
| ATTRIBUTE | ATTRIBUTE VALUE |
| MESSAGE URGENCY | URGENT MESSAGES |
| MESSAGE FROM | BOB JONES |
| MESSAGE DATE | WITHIN 2 DAYS |
| ATTACH-MENTS | REMOVE |

FIG. 6

METHOD AND APPARATUS FOR CONTROLLING DATA PROVIDED TO A MOBILE DEVICE

TECHNICAL FIELD

The systems and methods described herein relate to mobile devices and, more specifically, to controlling the flow of data to a mobile device from a data source.

BACKGROUND

As the popularity of the Internet continues to grow, an increasing number of people are accessing the Internet with their mobile devices. These mobile devices include cellular phones, personal digital assistants (PDAs), handheld computers, laptop computers, vehicle-based computer systems, and other types of portable or mobile computing systems. Mobile devices may be used to retrieve electronic mail (email) messages, stock quotes, sporting event scores, weather forecasts, and various other information available from numerous web sites and their associated web pages.

Many of these mobile devices are relatively small and contain a relatively small display screen. Therefore, it is important to limit the volume of information provided to the mobile device as compared to a device with a larger display screen. However, today's typical email systems are not optimized for mobile users. Further, these email systems are not easily customized to accommodate the user of a mobile device. As a result, obtaining email messages and other information via the Internet is tedious and time-consuming.

Additionally, many of these mobile devices connect to the Internet through a slow or reduced bandwidth communication link. For example, certain mobile devices connect to the Internet via a wireless network that has a communication bandwidth significantly less than typical broadband connections found in many offices and homes. Thus, it is important to limit the amount of data communicated to a mobile device to avoid long delays in communicating the data to the mobile device.

Accordingly, there is a need for systems and methods that allow a user of a mobile device to control the volume and type of data that is communicated to the mobile device.

SUMMARY

The systems and methods described herein allow the user of a mobile device or other computing device to define filter criteria that controls the flow of data to the mobile device. One or more filter criteria may be applied to data, such as email data, to limit the data that is communicated to the mobile device. The mobile device user may create one or more profiles that contain different filter criteria. Different profiles may be selected based on the type of data filtering currently desired by the mobile user.

In one embodiment, a request for data is received from a mobile device. Filter criteria associated with the mobile device is identified and applied to a set of data to identify particular data elements that satisfy the filter criteria. The identified data elements are then transmitted to the mobile device without transmitting data elements that do not satisfy the filter criteria.

In another embodiment, a filter criteria is defined to be applied to multiple email messages by an email server. The filter criteria is provided to the email server. A request to receive email messages is sent to the email server. An email message is received from the email server such that the received email message satisfies the filter criteria.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

FIG. 2 illustrates an exemplary email inbox maintained by an application running on a desktop computer system.

FIG. 3 illustrates another exemplary email inbox displayed on a mobile device, this email inbox displays a subset of the email messages illustrated in FIG. 2.

FIGS. 6 and 7 illustrate example user profiles, each containing various attributes and attribute values.

DETAILED DESCRIPTION

The systems and methods described herein allow users of computing devices, such as mobile devices, to control the communication of data from a source to the computing device. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Particular examples are described herein with reference to mobile devices, such as cellular phones and personal digital assistants (PDAs). However, the systems and methods described herein may be applied to any type of computing device that can communicate with another device via a communication link. As used herein, the term "mobile devices" shall mean any computing device that is capable of communicating with another device to exchange data. Example mobile devices include cellular phones, PDAs, handheld computers, laptop computers, vehicle-based computer systems, pagers, communicators, and the like.

Further, various examples discussed herein refer to the communication of electronic mail (email) data to a mobile device. However, the systems and methods described herein can be applied to any type of data, such as sports scores, instant messages, weather forecasts, movie listings, and stock quotes.

System Overview

Figure 1:
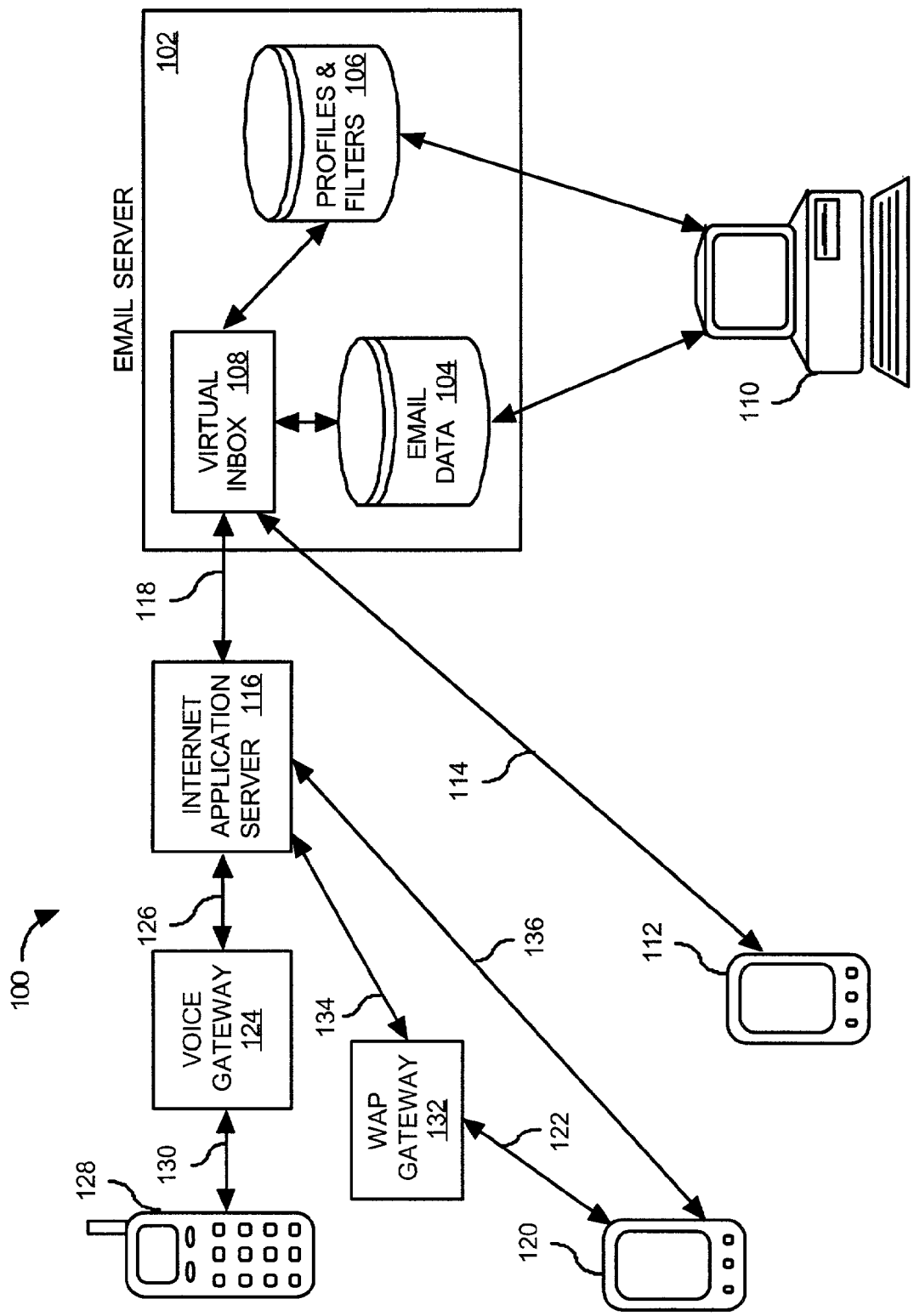
FIG. 1 illustrates an example environment in which the systems and methods discussed herein may be implemented.

FIG. 1 illustrates an example environment 100 in which the systems and methods discussed herein may be implemented. Environment 100 includes an email server 102, which contains an email data storage device 104, a profile data storage device 106 for various profiles and filters (discussed below), and a virtual inbox 108. Email server 102 receives email messages from multiple sources and distributes those email messages to the appropriate recipient(s). For example, email messages may be received via the Internet or via an intranet from multiple users and other sources. Users access email server 102 using an email application program, a web browser or other application program. Received email messages are stored in email data storage device 104 for retrieval by the recipient(s) of the email message. The received email messages typically remain stored in email data storage device 104 until the email message is deleted by the user or archived to another storage device. Email data storage device 104 is a hard disk drive or other non-volatile storage device. Profile data storage device 106 is also a hard disk drive or other non-volatile storage device. In a particular embodiment, the data contained in email data storage device 104 and the data contained in profile data storage device 106 is stored in a common storage device, such as a common disk drive.

Virtual inbox 108 applies filter criteria stored in profile data storage device 106 to email messages stored in email data storage device 104. After applying the appropriate filter criteria, a subset of selected email messages is identified. This subset of email messages is communicated to a mobile device, as discussed below. A particular embodiment of email server 102 maintains a separate virtual inbox for each mobile device user. In an alternative embodiment, server 102 maintains a separate virtual inbox for each mobile device of each mobile device user.

A desktop computer 110 is coupled to email server 102 and is capable of communicating with email data storage device 104 and profile data storage device 106. Desktop computer 110 includes a profile and filter management application program that allows a user to create and edit profiles as well as filter criteria stored in profile data storage device 106. As discussed below, a user can define any number of profiles and associated filter criteria for controlling the flow of email data from email server 102 to a mobile device. Additionally, desktop computer 110 typically includes an email application program for sending and receiving email messages. This email application program communicates with email data storage device 104 to send and retrieve email data.

A mobile device 112 is coupled to email server 102 via a communication link 114. Communication link 114 may be a wired link or a wireless link, or a combination of one or more wired links and one or more wireless links. For example, communication link 114 may be established across a public switched telephone network (PSTN) using a modem or similar communication device in mobile device 112. Alternatively, mobile device 112 may utilize a radio frequency or other wireless communication link to exchange data between email server 102 and mobile device 112.

In one embodiment, mobile device 112 communicates with email server 102 using Internet Messaging Access Protocol (IMAP). IMAP is a protocol that allows mail clients to interact with email servers and manipulate mailboxes (or inboxes) on the email servers. IMAP includes operations for creating and deleting messages as well as checking for new email messages, etc. In this embodiment, mobile device 112 includes at least one application program that is capable of communicating with email server 102 using IMAP to send and receive email message data. As shown in FIG. 1, mobile device 112 communicates with virtual inbox 108 in email server 102.

Mobile device 112 may also include an application program that allows the user of the mobile device to create and edit profiles as well as filter criteria stored in profile data storage device 106. Additionally, a user can change the active profile (or the active set of filter criteria) by entering one or more commands through mobile device 112.

An internet application server 116 is coupled to email server 102 via a communication link 118. Internet application server 116 provides an interface between email server 102 and the Internet. Internet-based devices are able to access information stored in email server 102 via internet application server 116. Internet application server 116 includes an email client that communicates with email server 102. Internet application server 116 is capable of communicating with multiple virtual inboxes 108 in email server 102. Additionally, internet application server 116 is capable of transforming data for display on a small device and playing audio files attached to email messages (e.g., transmitting audio data to a mobile device for listening by a user of the mobile device).

Communication link 118 may be a wired or a wireless communication link, or a combination thereof. In a particular embodiment, internet application server 116 communicates with email server 102 using IMAP. Internet application server 116 communicates with Internet-based devices using Wireless Access Protocol (WAP), HyperText Transfer Protocol (HTTP) or any other protocol supported by both internet application server 116 and the Internet-based device. WAP is a specification that allows users to access information via handheld wireless devices such as mobile phones, pagers, etc. HTTP is the underlying protocol used by the world wide web. HTTP defines how messages are formatted and transmitted, and what actions web servers and web browsers should take in response to various commands.

An example Internet-based device 120 includes a web browser or a WAP browser application that allows the device to communicate with internet application server 116 via a WAP gateway 132 or directly via a communication link 136. WAP gateway 132 provides conversion of signals between WAP protocol and HTTP protocol. Specifically, Internet-based device 120 communicates with WAP gateway 132 via a communication link 122, which is typically a wireless communication link with WAP protocol, but may be any type of communication link using any protocol. WAP gateway 132 communicates with internet application server 116 using a communication link 134. Typically, communication link 134 is a wired communication link using HTTP protocol. Alternatively, communication link 134 may be any type of communication link communicating with any protocol. If Internet-based device 120 includes a web browser application, then the device can communicate with internet application server 116 directly via communication link 136 using HTTP. In this embodiment, Internet-based device 120 does not need to communicate with WAP gateway 132.

A voice gateway 124 is coupled to internet application server 116 via a communication link 126. Voice gateway 124 provides an interface between a voice-only device, such as a cellular phone, and internet application server 116. In one embodiment, voice gateway 124 communicates with internet application server 116 using HTTP. The output from internet application server 116 is formatted in Voice extensible Markup Language (VoiceXML) or other voice markup languages supported by the voice gateway 124. VoiceXML allows interaction with the Internet through speech-recognition and text-to-speech technologies. For example, a user interacts with a voice browser by listening to audio data that is either pre-recorded or computer-synthesized and submits audio input through the user's natural speaking voice or through a telephone keypad.

As shown in FIG. 1, a cellular phone 128 is coupled to voice gateway 124 via a communication link 130. In a particular embodiment, communication link 130 is a wireless link using conventional cellular communication protocol(s). Cellular phone 128 exchanges data with voice gateway 124 which allows the cellular phone to, for example, send and receive email messages with email server 102.

Although a single desktop computer 110 is shown in FIG. 1, a particular email server may be coupled to any number of computing devices, including desktop computers, laptop computers, other servers, and the like. Similarly, any number of mobile devices may be coupled to email server 102 using both IMAP communication links and WAP or HTTP communication links. In FIG. 1, internet application server 116, voice gateway 124 and WAP gateway 132 are shown as separate components coupled to email server 102. In alternate embodiments, one or more of these components are incorporated into email server 102. In another embodiment, internet application server 116, voice gateway 124 and WAP gateway 132 are contained in a single component or device that is coupled to email server 102.

In a particular embodiment, email server 102 stores email messages, voicemail messages and facsimiles in a user's inbox. The email server 102 converts the voicemail messages to audio files (such as .wav files) and converts the facsimiles to text files or binary files. In this embodiment, internet application server 116 retrieves messages in a user's inbox and sends them directly to the mobile device or via voice gateway 124 or WAP gateway 132 for protocol conversion. The voice gateway is capable of playing the audio file and performing text-to-speech functions to convert email messages into an audio stream. Thus, mobile device 128 is able to listen to both email and voicemail messages as well as voicemail messages as email attachments.

The Desktop Email Inbox

FIG. 2 illustrates an exemplary email inbox 200 maintained by an email application running on a desktop computer system. Although this example refers to a desktop computer system, alternate embodiments may utilize a laptop computer system, a workstation, or other computing device. The email data is stored on an email server or other device, such as email server 102 (FIG. 1). The desktop computer system typically has a high-bandwidth connection to the email server, such as via a local area network (LAN). This high-bandwidth connection allows large amounts of email data to be communicated between the email server and the desktop computer system in a short period of time. Thus, the desktop computer system typically receives all email messages addressed to the user of the desktop computer system. Additionally, the display device used in the desktop computing system generally permits the display of significant amounts of email message data. Email inbox 200 represents an example display of email message data on a desktop computing system.

The email application executing on a user's desktop computer system retrieves email data associated with that user and displays at least a portion of the email data on the computer's display device. The email application also allows the user to manage the received email data and allows the user to create and distribute new email messages to one or more recipients. Email inbox 200 contains email message data associated with a particular user or email recipient.

Email inbox 200 includes an attribute column 202 that identifies various email attributes. For example, a check mark in attribute column 202 indicates that the corresponding email message has been flagged for follow-up at a future date and time. The "DOC" entries in attribute column 202 indicate that the corresponding email message has an attached document, such as a text file, a word processing file, or a spreadsheet file. An asterisk ("*") in attribute column 202 indicates that the corresponding email message has been marked as being of high importance. The high importance designation may be determined by the sender of the email message or by the email message recipient.

Email inbox 200 also includes a from column 204 indicating a source of each email message. A subject column 206 indicates the subject matter of the email message content. The data in the subject column 206 is typically provided by the source of the email message. A date column 208 indicates the date that the email message was sent (or the date that the email message was received by the email server). A scroll bar 210 allows the user to scroll through multiple email messages when the email inbox 200 contains too many email messages to display at the same time. A particular email inbox 200 may contain any number of email messages. Additionally, one or more folders associated with the email inbox 200 may contain email messages.

The Mobile Device Email Inbox

FIG. 3 illustrates another exemplary email inbox 300 displayed on a mobile device. Email inbox 300 displays a subset of the email messages illustrated in FIG. 2. This subset of email messages is generated by applying various filter criteria to the email messages associated with the user of the mobile device. The information displayed in both inboxes 200 and 300 is retrieved from a common email server or a common email storage device.

Since the mobile device typically has a smaller display screen than a desktop computer system, certain display columns are deleted or reduced in size. For example, an attribute column 302 identifies whether a particular email message has been designated high importance. However, attribute column 302 does not display other email message attributes, such as flagged email messages or message attachments. A from column 304 identifies the source of the email message and a subject column 306 identifies the subject of the associated email message. The width of columns 304 and 306 have been reduced with respect to the width of corresponding columns in FIG. 2 to allow the columns to fit on a smaller display screen.

To conserve display space, email inbox 300 does not contain a date column, which would indicate the date that the corresponding email message was sent (or received). Alternate embodiments of email inbox 300 may include a date column having a reduced amount of data (e.g., month and day information, but no year or day of the week information). A scroll bar 308 allows the user to scroll through multiple email messages when the email inbox 300 contains too many email messages to display at the same time. In the example of FIG. 3, there are not enough email messages to fill the display. Thus, there is no slide button or other scroll control mechanism in the scroll bar 308.

Although particular email data is illustrated in FIGS. 2 and 3, alternate email application programs may display different subsets of email data and may display email data in a different manner (e.g., arranged in a different order on the user's display). Further, email data associated with multiple users or email recipients may be displayed simultaneously on one or more display devices.

Email Filter Criteria

Figure 4:
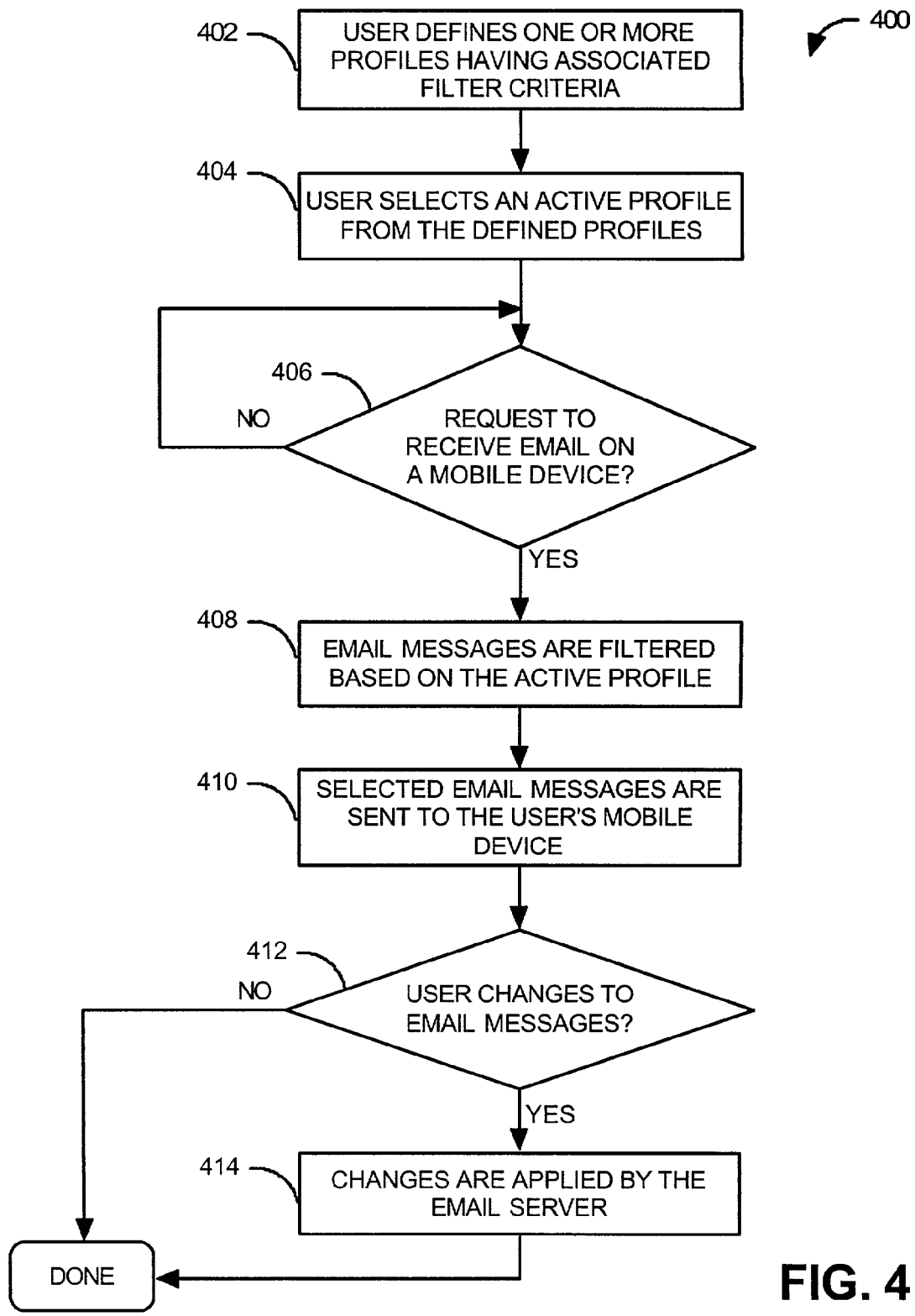
FIG. 4 illustrates a flow diagram of a procedure for defining and applying email filter criteria.

FIG. 4 illustrates a flow diagram of a procedure 400 for defining and applying email filter criteria. Typically, procedure 400 involves steps that are executed by an email server (such as email server 102 of FIG. 1) or other email processing system. Initially, a user defines one or more profiles. Each profile has an associated set of filter criteria (block 402). Example filter criteria includes specific values for email message urgency, the sender of the email message, the size of the email message, and the date associated with the email message. For example, one filter criteria may be "sender=joe@myisp.com". Another filter criteria may be "size<2 kilobytes".

In addition to email message filtering, one or more actions may be performed on the email messages. For example, actions may indicate whether or not to retrieve attachments from email messages or to truncate attachments larger than a particular size. Another action may transform the email message into a different format (e.g., transform an HTML email message into a pure text email message). Additionally, an action may cause a summary of the email message to be displayed rather than the entire email message. Various other actions may be performed on email messages in addition to the filtering procedures and other procedures discussed herein.

A particular profile may contain one or more filter criteria, based on the filtering requirements of the user. The filter criteria may also limit the portion of each email that is sent to the mobile device. For example, a particular filter criteria may allow the first 100 characters of an email message to be transmitted to the mobile device, but blocks transmission of the remainder of the email message. A user can edit the filter criteria associated with a particular profile at any time via a desktop computing system or a mobile device.

A user may establish multiple email filtering profiles, each of which is used in different situations. For example, a "vacation" or "evening" profile may filter out most email messages while a "work" profile has less restrictive filter criteria, thereby allowing more email messages to pass thorough the filter. After defining one or more profiles, the user selects one of the profiles as the active profile (block 404). The user can change the active profile at any time via a desktop computer system or a mobile device. The active profile is used by the email server to determine which email messages are communicated to the user's mobile device. Typically, one profile is active for a specific mobile device at a particular time. In a particular embodiment, each profile is associated with a particular mobile device. Users can edit filter criteria associated with a particular profile at any time. Additionally, users can change the active profile at any time.

The active profile can be selected or determined in various manners. In a particular embodiment, a profile is specified as the active profile by the email application on a mobile device (e.g., mobile device 112 in FIG. 1) when the email application establishes the connection to the email server. In an alternate embodiment, the selection of profiles can be presented to the users on their mobile devices as menu selection items. Once a profile is chosen, it becomes the active profile for the established email server connection. In another embodiment, the active profile can be determined by the device type or the device group. A device group is one or more types of devices and/or specific devices. For example, a device group may include a cellular phones capable of receiving email messages. Another device group may include a particular user's cellular phone and wireless PDA. In this embodiment, the selection of an active profile is automatically performed based on the device type of the group without any further user interaction.

The procedure 400 next determines whether a request to receive email messages on a mobile device has been received by an email server (block 406). Such a request may be received, for example, when a mobile device is powered on or when a user launches an email application on the mobile device. The request to receive email messages may identify the type of device on which the email messages will be received. Additionally, the request to receive email messages may identify a user of the mobile device or an email account from which email messages are to be retrieved.

After a request is received from a mobile device, the procedure selects which messages to make visible to the mobile device by filtering email messages (block 408) that are directed to the user of the device based on the filter criteria contained in the active profile of that user. In an embodiment that allows different mobile devices of the same user to have different active profiles, the filtering is performed based on the active profile of that user that is associated with the particular mobile device that is requesting the email.

Selected portions of selected email messages (i.e., those that satisfy the filter criteria of the active profile) are sent to the user's mobile device (block 410). Since the filtering of email messages is performed by the email server, only the messages that satisfy the filter criteria are sent to the mobile device. This filtering procedure results in a smaller amount of data being communicated to the mobile device as compared to an implementation in which all email messages are sent to the mobile device and the mobile device performs the filtering. The procedure then determines whether the user has changed (e.g., deleted) any email messages (block 412). If the user changed any of the email messages, those changes are applied by the email server (block 414). Thus, if a user deletes an email message (or otherwise changes an email message), that deletion is applied by the email server such that the email message is no longer available for retrieval by the mobile device or any other device.

When filtering email messages, the email server 102 may restrict its filtering to email messages in the user's inbox. Alternatively, the email server 102 may access and filter email messages in the user's inbox as well as one or more other email folders associated with the user.

Exchanging Data

Figure 5:
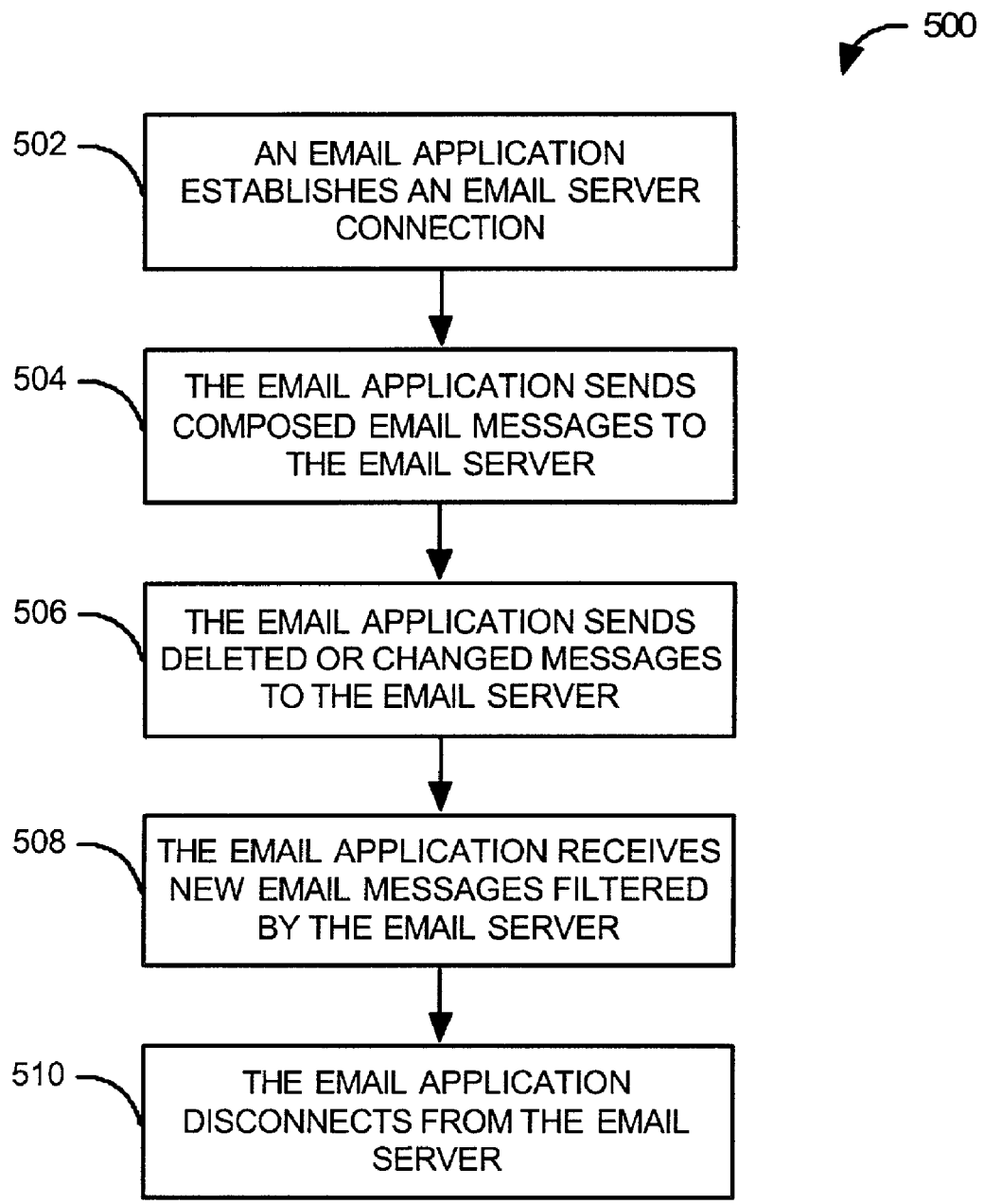
FIG. 5 illustrates a flow diagram of a procedure for exchanging data between an email server and a mobile device.

FIG. 5 illustrates a flow diagram of a procedure 500 for exchanging data between an email server and a mobile device. Initially, an email application (e.g., an email application running on a mobile device) establishes a connection with an email server (block 502). In this example, the email application supports disconnected email. This type of email application typically downloads email messages into an inbox on the mobile device and allows the user to read, change and delete messages when the mobile device is not connected to the email server. Any composed new messages are stored in an outbox on the mobile device while the mobile device is not connected to the email server.

After establishing a connection with the email server, the email application in the mobile device sends composed email messages to the email server (block 504). The email application also sends any deleted or changed email messages to the email server (block 506). The email application then receives new email messages filtered by the email server (block 508). Finally, the email application disconnects form the email server (block 510). The procedure illustrated in FIG. 5 may be performed at regular intervals (e.g., every two minutes or every hour) or in response to a user's request to send or receive email messages.

Example Profiles

FIGS. 6 and 7 illustrate example user profiles 600 and 700, each containing various attributes and attribute values. User profile 600 identifies several different attributes that are applied to each email message to determine whether to transmit the email message to the associated mobile device. A first attribute, "message urgency", requires that a message be an urgent message (also referred to as "high importance" or "high priority") to be sent to the mobile device. Thus, all non-urgent messages are filtered out by this first attribute. A second attribute, "message from", requires that the email message is from "Bob Jones" to satisfy the attribute. A third attribute, "message date", requires that the date of the email message is within the past two days.

Finally, a fourth attribute, "attachments", requires that all attachments be removed from the email message before sending the email message to the mobile device. This last attribute is a command rather than a condition. All email messages will satisfy this attribute regardless of whether the email message has any attachments. However, if the email message satisfies the other three attributes, the fourth attribute will instruct the email server to remove any attachments from the email message prior to sending the email message to the mobile device.

The first three attributes shown in user profile 600 may be applied using multiple logic rules. For example, the filter criteria may be satisfied if any one of the attributes is satisfied. In this example, the attributes would be logically linked as follows:

SEND IF (Urgency=Urgent) OR (From=Bob Jones) OR (Date=W/In 2 Days)

Alternatively, the filter criteria is satisfied when all three of the attributes are satisfied. In this example, the attributes would be logically linked as follows:

SEND IF (Urgency=Urgent) AND (From=Bob Jones) AND (Date=W/In 2 Days)

In another embodiment, a combination of logical OR and logical AND operations are applied to the three attributes. For example:

SEND IF (Urgency=Urgent) OR ((From=Bob Jones) AND (Date=W/In 2 Days))

Various other combinations can be implemented depending on the desires of the user.

Referring to FIG. 7, user profile 700 identifies two different attributes that are applied to each email message to determine whether to transmit the email message to the associated mobile device. A first attribute, "message urgency", requires that a message be an urgent message to be sent to the mobile device. Thus, all non-urgent messages are filtered out by this first attribute. A second attribute, "message from", requires that the message be from "Bob Jones" or "Jennifer". As discussed above, the attributes can be combined using different combinations of the logical OR and logical AND operations. A particular profile may contain any number of attributes and any number of satisfactory values associated with each attribute.

Hardware Overview

Figure 8:
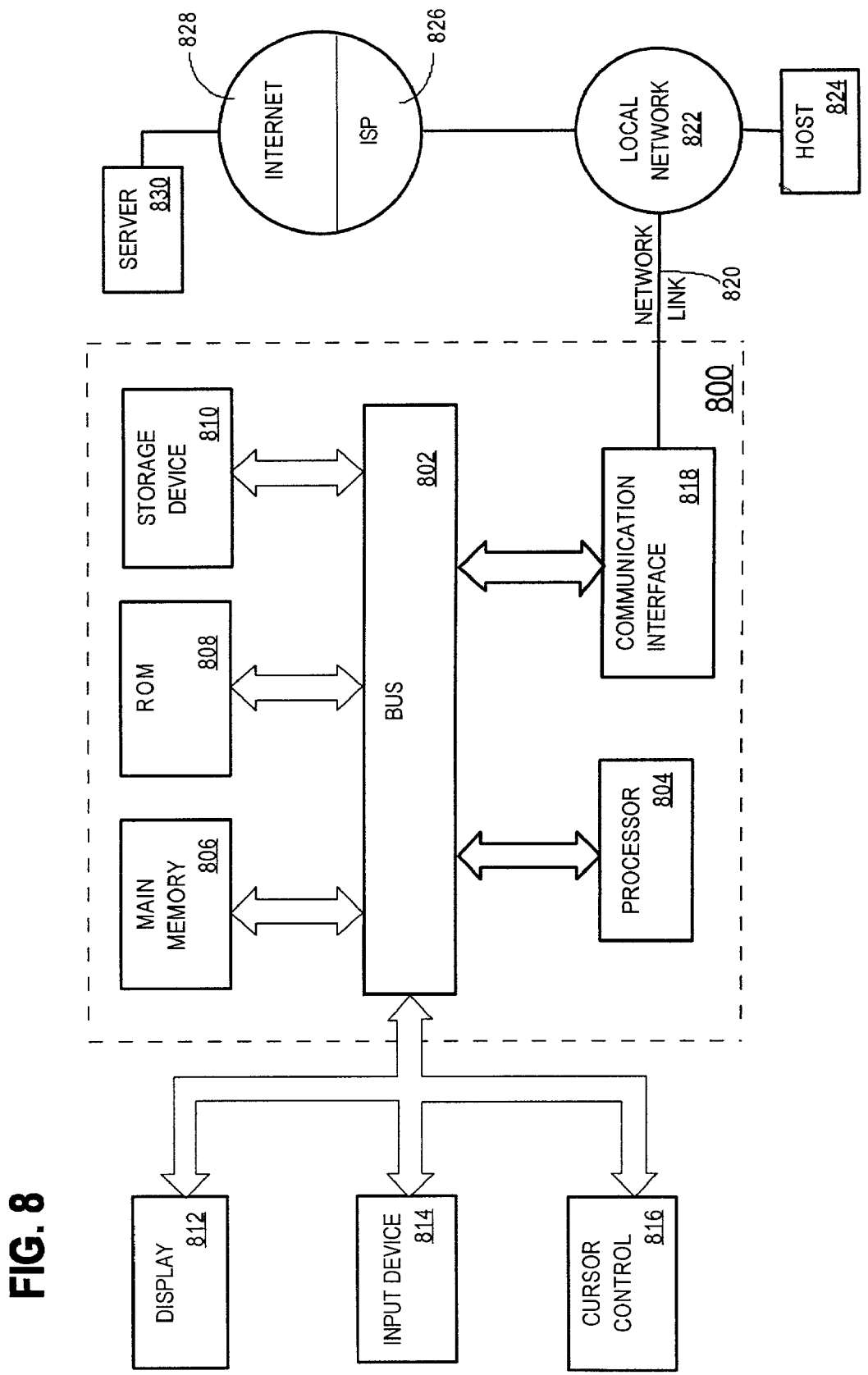
FIG. 8 is a block diagram that illustrates a computer system upon which the procedures discussed herein may be implemented.

FIG. 8 is a block diagram that illustrates a computer system 800 upon which the procedures discussed herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The described systems and methods are related to the use of computer system 800 for implementing various techniques described herein. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the systems and methods described herein. Thus, the described systems and methods are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

What is claimed is:

1. A method for handling email messages, the method comprising:
   receiving, from a first mobile device of a user, a request for email messages that are associated with an email account, wherein the request does not specify use of any particular profile or any particular filter criteria;
   wherein the email account is associated with multiple profiles;
   wherein each profile of the multiple profiles is associated with a different set of filter criteria;
   in response to the request, performing particular steps comprising:
      identifying a first active profile that is associated with the first mobile device;
      identifying a particular set of filter criteria that is associated with the first active profile of the multiple profiles associated with the email account;
      wherein the multiple profiles include a second active profile that is associated with a second mobile device of the user;
      wherein the second mobile device is separate from the first mobile device;
      applying the particular set of filter criteria to a set of email messages to identify selected email messages that satisfy the filter criteria in the particular set of filter criteria, thereby filtering email messages;
      wherein the filtering is performed based on an active profile that is associated with the first mobile device that is requesting email messages; and
      transmitting the selected email messages to the first mobile device.

2. The method of claim 1, wherein the particular set of filter criteria includes an urgency associated with each email message.

3. A volatile or non-volatile computer-readable medium carrying one or more sequences of instructions which, when executed by one or more processors, causes the one or more processors to perform the method recited in claim 2.

4. The method of claim 1, wherein the particular set of filter criteria includes a source associated with each email message.

5. A volatile or non-volatile computer-readable medium carrying one or more sequences of instructions which, when executed by one or more processors, causes the one or more processors to perform the method recited in claim 4.

6. The method of claim 1, wherein the particular set of filter criteria includes a date associated with each email message.

7. A volatile or non-volatile computer-readable medium carrying one or more sequences of instructions which, when executed by one or more processors, causes the one or more processors to perform the method recited in claim 6.

8. The method of claim 1, wherein the particular set of filter criteria is specified by the user.

9. A volatile or non-volatile computer-readable medium carrying one or more sequences of instructions which, when executed by one or more processors, causes the one or more processors to perform the method recited in claim 8.

10. The method of claim 1 further comprising:
    receiving a request to delete one of the selected email messages; and
    deleting the requested email message from the set of email messages.

11. A volatile or non-volatile computer-readable medium carrying one or more sequences of instructions which, when executed by one or more processors, causes the one or more processors to perform the method recited in claim 10.

12. The method of claim 1, further comprising:
    receiving a request to change the particular set of filter criteria; and
    updating the particular set of filter criteria applied to the set of email messages.

13. A volatile or non-volatile computer-readable medium carrying one or more sequences of instructions which, when executed by one or more processors, causes the one or more processors to perform the method recited in claim 12.

14. The method of claim 1, wherein the received request for email messages includes information identifying an email account associated with the user.

15. A volatile or non-volatile computer-readable medium carrying one or more sequences of instructions which, when executed by one or more processors, causes the one or more processors to perform the method recited in claim 14.

16. The method of claim 1 wherein the received request for email messages is communicated from the mobile device using the Internet Messaging Access Protocol.

17. A volatile or non-volatile computer-readable medium carrying one or more sequences of instructions which, when executed by one or more processors, causes the one or more processors to perform the method recited in claim 16.

18. A volatile or non-volatile computer-readable medium carrying one or more sequences of instructions which, when executed by one or more processors, causes the one or more processors to perform the method recited in claim 1.

19. The method of claim 1, wherein:
the multiple profiles include a plurality of profiles selectable by the first mobile device;
one of the plurality of profiles selectable by the first mobile device is currently designated as an active profile for the first mobile device; and
the step of identifying the particular set of filter criteria includes identifying filter criteria associated with the currently designated active profile for the first mobile device.

20. A volatile or non-volatile computer-readable medium carrying one or more sequences of instructions which, when executed by one or more processors, causes the one or more processors to perform the method recited in claim 19.

21. The method of claim 1, wherein the request is a user-initiated request.

22. A volatile or non-volatile computer-readable medium carrying one or more sequences of instructions which, when executed by one or more processors, causes the one or more processors to perform the method recited in claim 21.

23. The method of claim 1, wherein:
the first active profile is a sole active profile for the first mobile device at a same time that the second active profile is a sole active profile for the second mobile device; and
the first active profile and the second active profile both are associated with the email account.

24. A volatile or non-volatile computer-readable medium carrying one or more sequences of instructions which, when executed by one or more processors, causes the one or more processors to perform the method recited in claim 23.

* * * * *

UNITED STATES PATENT AND TRADEMARK OFFICE
CERTIFICATE OF CORRECTION

PATENT NO. : 7,522,910 B2 Page 1 of 1
APPLICATION NO. : 10/159223
DATED : April 21, 2009
INVENTOR(S) : Day It is certified that error appears in the above-identified patent and that said Letters Patent is hereby corrected as shown below:

In column 4, line 54, delete "extensible" and insert -- eXtensible --, therefor.

Signed and Sealed this

Twenty-fifth Day of May, 2010

David J. Kappos
*Director of the United States Patent and Trademark Office*